W. S. NEAL.
Combined Cotton Chopper and Cultivator.

No. 225,411. Patented Mar. 9, 1880.

WITNESSES:
Chas. Nidd.
C. Sedgwick

INVENTOR:
W. S. Neal
BY Munn & Co.
ATTORNEYS.

UNITED STATES PATENT OFFICE.

WILLIAM S. NEAL, OF PERDUE HILL, ALABAMA.

COMBINED COTTON CHOPPER AND CULTIVATOR.

SPECIFICATION forming part of Letters Patent No. 225,411, dated March 9, 1880.

Application filed November 13, 1879.

*To all whom it may concern:*

Be it known that I, WILLIAM SHAEFFER NEAL, of Perdue Hill, in the county of Monroe and State of Alabama, have invented a new and useful Improvement in Combined Cotton Choppers and Cultivators, of which the following is a specification.

Figure 1:
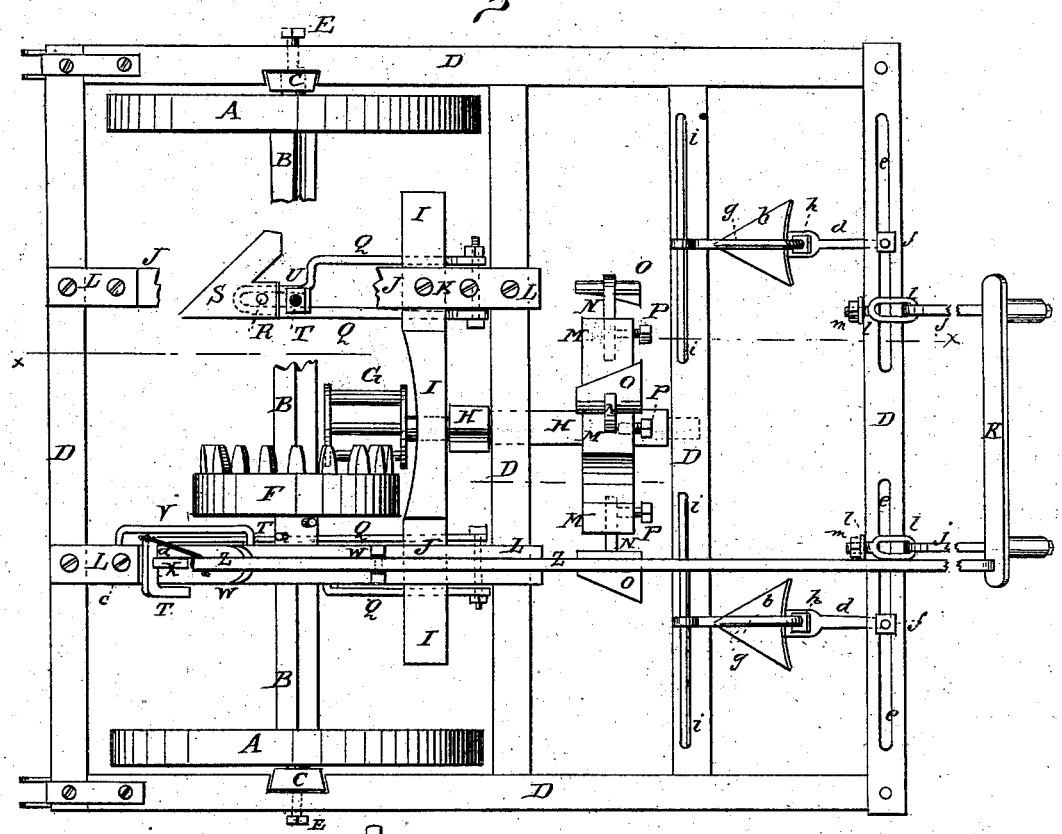
Figure 2:
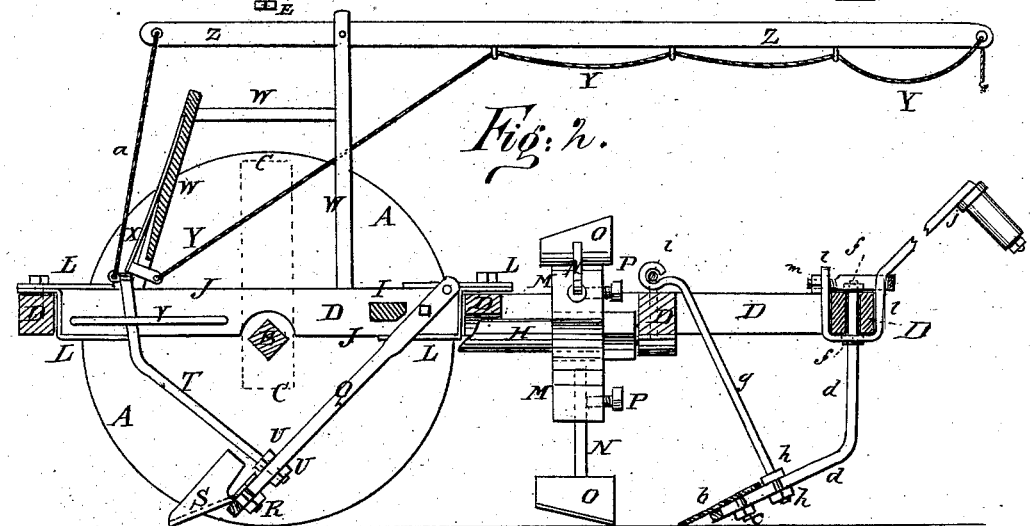

Figure 1 is a plan view of my improvement. Fig. 2 is a sectional side elevation taken through the line $x\ x$, Fig. 1.

The object of this invention is to furnish combined cotton choppers and cultivators so constructed that they may be readily adjusted, as the character of the work to be done may require.

Similar letters of reference indicate corresponding parts.

A represents the wheels, the axle-boxes of which are made square to receive the square axle B, so that the wheels A may carry the said axle B with them in their revolution. The wheels A are designed to be secured in place upon the axle B by set-screws or other suitable means, so that they may be moved closer together or farther apart, as may be desired.

The ends of the axle B revolve in bearings in the lower parts of upright bars C, which slide up and down in notches in the inner sides of the side bars of the frame D, and are secured in place adjustably by screws or bolts E passing through them and through the said side bars, so that the frame D and its attachments can be raised and supported above the ground, and thus be prevented from operating while the machine is being drawn from place to place.

To the middle part of the axle B is attached a large gear-wheel, F, which should be secured to the axle B by pins, set-screws, or other suitable means, so that the gear-wheel F can be adjusted as required. The teeth of the gear-wheel F mesh into the teeth of a small gear-wheel or pinion, G, attached to the forward end of the shaft H.

The forward part of the shaft H revolves in bearings in the short cross-bar I, which has long tenons formed upon its ends to enter mortises in the short longitudinal bars J, attached to the forward pair of cross-bars of the frame D, so that the gear-wheels G F may be thrown into and out of gear by adjusting the cross-bar I. The cross-bar I is secured in place, when adjusted, by screws K passing down through the bars J, or by other suitable means.

The ends of the short longitudinal bars J are secured adjustably to the cross-bars of the frame D by clamping-plates L, as shown in the drawings, or by other suitable means, so that the said bars may be moved closer together or farther apart, as may be desired.

The rear end of the shaft H revolves in bearings in the rear middle cross-bar of the frame D. To the shaft H, between the two middle cross-bars of the frame D, is attached a wheel or holder, M, to which are attached the shanks N of three (more or less) hoes, O. The shanks N are secured to the wheel M by set-screws P or other suitable means, so that the hoes O may be adjusted as required. The cutting-edges of the hoes O are inclined, as shown in Figs. 1 and 2, to counteract the effect of the forward movement of the machine to cause the hoes to make a square cut in chopping the plants and prevent the forward ends of the hoes from being drawn against the uncut plants and breaking them down or injuring them.

To the rear ends of the short longitudinal bars J are attached the upper ends of the plow-standards Q. Several holes are formed in the upper ends of the plow-standards Q to receive the fastening-bolts, so that the said standards can be raised and lowered to adjust the plows to work shallower or deeper in the ground, as may be required.

The standards Q are formed of bars of iron bent into U form. The spaces between the arms of the standards Q at their bends are narrow, being only wide enough to receive the bolts R, that fasten the plows S to the said standards. The outer arms of the standards Q, at a point a little above the plows S, have offsets formed in them, so that the upper ends of the said arms may be at such a distance apart as to receive the bars J between them. One of the plows S is a right-hand plow and the other is a left-hand plow, so that they may throw the soil from the plants in barring off. In cultivating, the plows S are exchanged, so as to throw the soil toward and around the plants.

The inner edges of the plows S are bent forward to serve as colters, to separate the furrow-slice from the soil around the plants and prevent the plants from being torn up or disturbed by the breaking away of the soil in which they stand.

The draft-strain upon the standards Q is sustained by the braces T, the lower ends of which pass between the arms of the standards Q just below the offsets in said standards, where they are secured in place by nuts U, placed upon them above and below the said standards, so that the plows may be adjusted to work deeper or shallower in the ground by adjusting the nuts U. The plows S may also be adjusted to work deeper or shallower in the ground by loosening the bolts R and moving the plows S down or up upon the standards Q.

The braces T pass up through long keepers V, attached to the inner sides of the short longitudinal bars J. Upon the upper ends of braces T are formed hooks to hook over the forward parts of the short longitudinal bars J and sustain the draft-strain. The hooks of the braces T rest upon the bars J at the angle between the said bars J and the inclined forward posts of the upright frames W, attached to the short bars J.

The braces T are prevented from rising while the machine is at work by spring-catches X, attached to the inclined forward posts of the upright frames W. To the spring-catches X are attached the ends of cords Y, which pass through guide-holes in the rear posts of the upright frames W, through guide-eyes attached to the under sides of the levers Z, and extend back into such a position that their rear ends may be readily grasped by the plowman to draw back the spring-catches X and allow the braces T to be raised.

The levers Z are pivoted to the projecting upper ends of the rear posts of the upright frames W, and to their forward ends are attached the upper ends of cords $a$. The lower ends of the cords $a$ are attached to the hooks of the braces T. With this construction, when the plowman wishes to raise the forward or barring-off plows from the ground for convenience in turning around or passing obstructions, he draws upon the cords Y to draw back the spring-catches X, and then operates the levers Z to raise the braces T, and with them the plows S. As the rear ends of the levers Z are released the plows S drop to the ground by their own weight, and are again secured in place by the spring-catches X.

$b$ are the rear or dirting plows, which are secured by bolts $c$ to the slotted lower ends of the standards $d$, so that the plows may be adjusted to work deeper or shallower in the ground by loosening the said bolts $c$. The standards $d$, at a point a little above the plows $b$, are bent upward, pass through long slots $e$, formed longitudinally in the rear cross-bar of the frame D, and have screw-threads cut upon their upper ends to receive the nuts $f$, which are screwed upon them above and below the said slotted cross-bar.

To the standards $d$, a little above the plows $b$, are attached braces $g$, to receive the draft-strain upon the said standards. The lower ends of the braces $g$ pass through the upper ends of the slots in the lower ends of the standards $d$, and have screw-threads cut upon them to receive the nuts $h$, which are screwed upon them above and below the said standards $d$, so that the pitch of the plows $b$ can be regulated by adjusting the said nuts $h$. The upper ends of the braces $g$ are bent forward and have eyes formed in them to receive the long staples $i$, which are attached to the upper side of the rear middle cross-bar of the frame D. With this construction the dirting-plows $b$ can be adjusted nearer together or farther apart by loosening the nuts $f$ and sliding the standards $d$ toward or from each other, the braces $g$ sliding correspondingly upon the staples $i$.

The barring-off plows S are adjusted nearer together or farther apart by moving the short longitudinal bars J toward or from each other.

$j$ are the handles, which are connected a little below their upper ends by a cross-bar, $k$. The handles $j$ are bent into U form at their lower ends, to pass around and fit upon the rear cross-bar of the frame D, where they are secured in place by the slotted or loop bolts $l$. The handles $j$ are passed through the slots or loops of the bolts $l$, and the ends of the said bolts $l$ are passed through holes in the ends of the handles $j$, and have nuts $m$ screwed upon them, so that by loosening the nuts $m$ the handles $j$ may be moved toward either side of the frame D, as may be desired.

By detaching the chopper or throwing it out of gear and adjusting the plows the machine may be used for cultivating plants.

Having thus fully described my invention, I claim as new and desire to secure by Letters Patent—

1. In a cotton chopper and cultivator, the combination, with the cross-bar of the frame D, of the handles $j$, bent into U form at their lower ends, and the slotted bolts $e$, substantially as herein shown and described, whereby the handles may be adjusted laterally, as set forth.

2. In a cotton chopper and cultivator, the combination, with the adjustable bars J, the upright frames W, and the standards Q, of the hook-braces T and the spring-catches X, substantially as herein shown and described, so that the plows S can be adjusted vertically, as set forth.

3. In a cotton chopper and cultivator, the combination, with the hook-braces T, the plow-standards Q, and the spring-catches X, of the cords Y $a$ and the levers Z, substantially as herein shown and described, for raising the barring-off plows S from the ground, as set forth.

WILLIAM SHAEFFER NEAL.

Witnesses:
JAMES A. MARSHALL,
C. M. SIMMONS.